United States Patent
Tsirkin

(10) Patent No.: US 12,455,760 B2
(45) Date of Patent: Oct. 28, 2025

(54) PASSING SINGLE-ROOT INPUT-OUTPUT VIRTUALIZATION FUNCTIONS TO NESTED VIRTUAL MACHINES

(71) Applicant: RED HAT, INC., Raleigh, NC (US)

(72) Inventor: Michael Tsirkin, Yokneam (IL)

(73) Assignee: Red Hat, Inc., Raleigh, NC (US)

( * ) Notice: Subject to any disclaimer, the term of this patent is extended or adjusted under 35 U.S.C. 154(b) by 478 days.

(21) Appl. No.: 18/095,563

(22) Filed: Jan. 11, 2023

(65) Prior Publication Data

US 2024/0231872 A1 Jul. 11, 2024

(51) Int. Cl.
G06F 9/455 (2018.01)

(52) U.S. Cl.
CPC ........... *G06F 9/45558* (2013.01); *G06F 2009/45566* (2013.01); *G06F 2009/45579* (2013.01)

(58) Field of Classification Search
None
See application file for complete search history.

(56) References Cited

U.S. PATENT DOCUMENTS

| | | | |
|---|---|---|---|
| 9,176,767 | B2 | 11/2015 | Cantu |
| 9,898,430 | B2 | 2/2018 | Davda et al. |
| 2020/0057567 | A1* | 2/2020 | Hutcheson ......... G06F 9/45558 |
| 2021/0279090 | A1 | 9/2021 | Hu et al. |
| 2021/0303356 | A1* | 9/2021 | Tsirkin ............... G06F 9/45558 |
| 2021/0318962 | A1* | 10/2021 | Tsirkin ............... G06F 12/1009 |
| 2022/0027207 | A1 | 1/2022 | Kakaiya et al. |
| 2022/0056130 | A1 | 2/2022 | Nair |
| 2022/0263892 | A1 | 8/2022 | Johnsen et al. |

OTHER PUBLICATIONS

Lim et al., "Optimizing Nested Virtualization Performance Using Direct Virtual Hardware," https://www.cs.columbia.edu/~nieh/pubs/asplos2020_dvh.pdf, Mar. 16-20, 2020; pp. 557-573.
Xu et al., "SRVM: Hypervisor Support for Live Migration with Passthrough SR-IOV Network Devices," https://dl.acm.org/doi/pdf/10.1145/2892242.2892256?download=true, Apr. 2-3, 2016; pp. 65-77.

\* cited by examiner

*Primary Examiner* — Craig C Dorais
(74) *Attorney, Agent, or Firm* — Kilpatrick Townsend & Stockton LLP

(57) ABSTRACT

Single-root input-output virtualization (SR-IOV) can be enabled for nested virtual machines using mapping. In one example, a host hypervisor can assign at least two guest virtual functions to a guest virtual machine such that each guest virtual function maps to a respective host virtual function executed by a SR-IOV device. The first guest virtual function of the at least two guest virtual functions can be configured to act as a guest physical function. The host hypervisor can receive a request generated by a nested virtual function assigned to a nested virtual machine hosted by the guest virtual machine. In response to receiving the request, the host hypervisor can translate a guest memory address of the guest physical function to a host memory address for the guest physical function. The host hypervisor can forward the request to the guest physical function for fulfillment using the translated host memory address.

20 Claims, 3 Drawing Sheets

PASSING SINGLE-ROOT INPUT-OUTPUT VIRTUALIZATION FUNCTIONS TO NESTED VIRTUAL MACHINES

TECHNICAL FIELD

The present disclosure relates generally to virtual machines. More specifically, but not by way of limitation, this disclosure relates to passing single-root input-output virtualization functions to nested virtual machines.

BACKGROUND

Virtualization may be used to provide some physical components as logical objects in order to allow running various software modules, concurrently and in isolation from other software modules, on a computing device or a collection of connected computing devices. Virtualization may allow, for example, for consolidating multiple physical servers into one physical server running multiple guest virtual machines in order to improve the hardware utilization rate. Single-root input-output (SR-IOV) is a virtualization concept that can enable virtualization in single-root complex instances. A virtual machine can be a substantially isolated environment that has its own operating system, software applications, and virtualized hardware. For example, a virtual machine can have a virtual Central Processing Unit (vCPU), a virtual Random Access Memory (vRAM), and other components.

Virtualization may be achieved by running a software layer, often referred to as a hypervisor, to manage processor resources allocated to guest virtual machines. The hypervisor may virtualize the physical layer and provide interfaces between the underlying hardware and guest virtual machines and any guest operating systems. The hypervisor can use these interfaces to manage resources given to applications running on a guest virtual machine. A guest virtual machine may itself provide virtual machines and therefore may include its own hypervisor. The top-level hypervisor is often referred to as the host hypervisor and a hypervisor for a nested virtualization environment can be referred to as a nested hypervisor.

DETAILED DESCRIPTION

Figure 1:
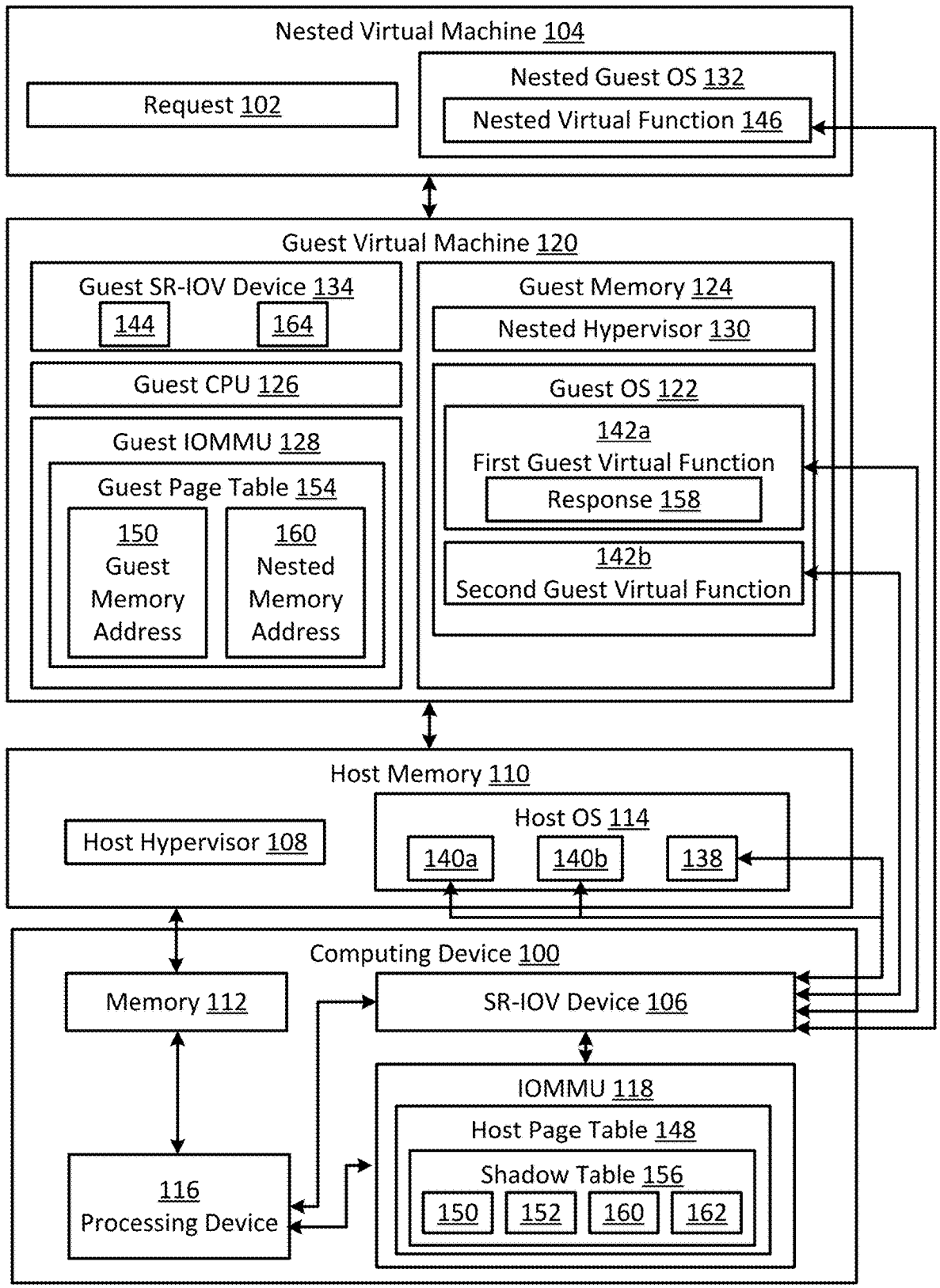
FIG. 1 is a block diagram of an example of a computing device for passing single-root input-output virtualization functions to nested virtual machines according to one example of the present disclosure.

As virtual machines become more ubiquitous, nesting of virtual machines is emerging as an important technique for further partitioning and managing virtual machines. In some cases, nested virtual machines may have limited capabilities, including limited support for single-root input-output virtualization (SR-IOV) on peripheral component interface (PCI) devices, also referred to herein as SR-IOV devices. SR-IOV devices can separate access to its resources via hardware functions. The hardware functions include a physical function, which is the primary function used to manage the SR-IOV device, and one or more virtual functions associated with the physical function. A host hypervisor managing a virtual machine can assign virtual functions to a virtual machine by mapping host memory addresses for the virtual functions into memory for the virtual machine. The virtual machine can then send control request messages to the virtual functions, which are forwarded by the SR-IOV device to the physical function. The host hypervisor, which can be attached to the physical function, can send control response messages on the physical function to be forwarded by the SR-IOV device to the virtual functions and thus to the virtual machine. Each virtual machine may host one or more nested virtual machines. But, the nested virtual machines may not have full access to SR-IOV capabilities, even if the physical function is passed via the host hypervisor. For instance, virtual functions may be created after a physical function driver is loaded in the virtual machine. Specifically, a guest virtual machine may only pass the physical function to a single nested virtual machine, thereby limiting scalability for virtual machine nesting.

Some examples of the present disclosure can overcome one or more of the issues mentioned above by mapping memory addresses for device functions associated with an SR-IOV device. For example, a guest virtual machine may have a virtualized SR-IOV device including a guest physical function and guest virtual functions. The virtual guest memory addresses for the guest functions, including the guest physical function, can be mapped to host memory addresses for virtual functions on the SR-IOV device. Additionally, the guest virtual machine can generate a nested virtual machine with a virtualized physical function and virtual functions, each having virtual memory addresses mapped to the guest memory addresses for the guest virtual functions. The virtual memory addresses are therefore also mapped to the host memory addresses for the virtual functions of the SR-IOV device. Thus, when the nested virtual machine sends a request to a nested virtual function, the mappings can be used to determine which "source" virtual function is associated with the nested virtual function receiving the request. Additionally, the mappings can be used to determine the host memory address for the guest physical function (e.g., the virtual function assigned to the guest virtual machine acting as a physical function) that can generate a response for the request. Responses and requests can be passed using the host memory addresses for the appropriate functions. In this way, virtual functions acting as physical functions can be passed to multiple levels of nested virtual machines, enabling SR-IOV capabilities.

In one particular example, to enable scalable nesting of virtual machines with SR-IOV capabilities, a computing device can include an SR-IOV device with one physical function (e.g., a host physical function) and three virtual functions (e.g., host virtual functions). Each function can have a host memory address in the computing device. The computing device can include a guest virtual machine managed by a host hypervisor. The guest virtual machine can include a virtualized guest SR-IOV device with a guest physical function and two virtual functions. The guest physical function can correspond to the first host virtual function, and the guest virtual functions can correspond to the second and third host virtual functions. The guest virtual machine may also include a nested hypervisor that can manage a nested virtual machine. Similar to the guest virtual machine, the nested virtual machine can include a virtualized nested SR-IOV device, with a nested physical function (corresponding to the first guest virtual function, and therefore to the second host virtual function), and a nested virtual function (corresponding to the second guest virtual function, and therefore to the third host virtual function). Mappings between addresses in host memory, guest memory, and nested memory can be stored in an input-output memory management unit (IOMMU) and virtual IOMMUs.

The mappings can be used to facilitate SR-IOV capabilities for the nested virtual machine. For example, the nested virtual machine can send a request to the nested virtual function. The nested virtual function may need to send the request to its associated physical function (e.g., the guest physical function). But, the nested virtual function may not have access to the memory address for the guest physical function, which may prevent the nested virtual function from directly transmitting the request to the guest physical function. Instead, the nested virtual function can transmit the request to the host physical function for the SR-IOV device. The host hypervisor, which can be attached to the host physical function, can access memory address mappings to forward the request to the host virtual function associated with the guest physical function. The guest physical function can generate a response based on the request, which can be transmitted back to the nested virtual function in a similar manner. For example, the guest physical function can transmit the response to the host physical function via the first host virtual function associated with the guest physical function. Then, the host hypervisor can access the memory address mappings to identify the host memory address for the host virtual function associated with the nested virtual function. The identified memory address can be used to transmit the response to the nested virtual function and therefore the nested virtual machine, therefore fulfilling the response.

These illustrative examples are given to introduce the reader to the general subject matter discussed herein and are not intended to limit the scope of the disclosed concepts. The following sections describe various additional features and examples with reference to the drawings in which like numerals indicate like elements, and directional descriptions are used to describe the illustrative aspects, but, like the illustrative aspects, should not be used to limit the present disclosure.

FIG. 1 is a block diagram of an example of a computing device 100 for passing single-root input-output virtualization (SR-IOV) functions to nested virtual machines according to one example of the present disclosure. The computing device 100 can fulfill a request 102 for a nested virtual machine 104 using mapping for the SR-IOV functions that are executed by an SR-IOV device 106 associated with the computing device 100. Additionally, the computing device 100 can execute software as defined below, which can cause the computing device 100 to perform the tasks of providing a host hypervisor 108 in host memory 110 that resides in memory 112. The host memory 110 additionally can include a host operating system (OS) 114. The computing device 100 can include a processing device 116, a memory 112, an SR-IOV device 106, and an input-output memory management unit (IOMMU) 118. In some examples, the SR-IOV device 106 may be a peripheral component interface (PCI) card (e.g., a network interface card) that is plugged into a PCI module (not pictured) of the computing device 100.

The computing device 100 can run a guest virtual machine 120 by executing the host hypervisor 108 and the host OS 114. In some examples, the host OS 114 can execute the host hypervisor 108. Alternatively, the computing device 100 can execute the host hypervisor 108 separately from, or exclusive of, the host OS 114. The host hypervisor 108 can virtualize a physical layer of the computing device 100, including processors, memory devices, I/O devices, and the like and present this virtualization to the guest virtual machine 120 as devices, including virtual processors, virtual memory devices, and virtual I/O devices. The guest virtual machine 120 may run any type of dependent, independent, or compatible applications on the underlying hardware and host OS 114. In this example, the guest virtual machine 120 is executing a guest OS 122 that resides in guest memory 124, which may utilize underlying hardware (e.g., a guest central processing unit (CPU) 126 or a guest IOMMU 128).

The guest virtual machine 120 can include a nested hypervisor 130 that resides in the guest memory 124. In the same manner as described above, the guest virtual machine 120 can execute the nested hypervisor 130 to deploy the nested virtual machine 104 within the guest virtual machine 120. The nested virtual machine 104 may include nested virtualized resources, including a nested guest OS 132. The guest virtual machine 120 additionally can include a guest SR-IOV device 134.

SR-IOV capabilities of the SR-IOV device 106 may be accessed using SR-IOV device functions, including a physical function 138 and one or more host virtual functions 140a-b. In some examples, the physical function 138 may reside in host memory 110, such as the host OS 114. Each host virtual function may be passed to the guest virtual machine 120 and may reside in the guest OS 122 of the guest memory 124. Once the host virtual functions 140a-b are within the guest OS 122, the host virtual functions 140a-b may be referred to as guest virtual functions 142a-b. When assigned to the guest virtual machine 120, each guest virtual function of the guest virtual functions 142a-b may be identified using a virtual function number 144. For example, the host hypervisor 108 may determine the virtual function number 144 for each guest virtual function starting from zero up to a total number of guest virtual functions 142a-b assigned to the guest virtual machine 120. In some examples, the host hypervisor 108 may assign a virtual function number 144 of zero to a first guest virtual function 142a. Additionally or alternatively, the virtual function number 144 for each guest virtual function may be assigned arbitrarily (e.g., randomly or without a specific pattern).

A guest physical function can be the first guest virtual function 142a assigned to the guest virtual machine 120 that acts as a physical function for the guest virtual machine 120. For example, with respect to the guest virtual machine 120, the first guest virtual function 142a may be identified as the physical function, while other guest virtual functions (e.g., a second guest virtual function 142b) may be identified as virtual functions. From a perspective of the host hypervisor 108, the first guest virtual function 142a can be identified as a virtual function for the guest virtual machine 120. Similarly, one or more guest virtual functions 142a-b may be further passed to the nested virtual machine 104 and may reside in the nested guest OS 132. Such a guest virtual function in the nested virtual machine 104 can be referred to as a nested virtual function 146.

A host page table 148 may be created to store mappings associated with the SR-IOV device functions. In some examples, the host hypervisor 108 can generate mappings to link a memory address for a virtualized layer to another memory address for a physical layer. As an illustrative example, the mappings can include a guest memory address 150 for the guest physical function mapped by the host hypervisor 108 to a host memory address 152 for the guest physical function. In some instances, the guest IOMMU 128 positioned in the guest virtual machine 120 may store the guest memory address 150 for the guest physical function in a guest page table 154. The guest memory address 150 for the guest physical function can indicate a virtual location of the guest physical function in the guest virtual machine 120. Similarly, the host memory address 152 for the guest physical function can indicate an actual location of the guest physical function in the computing device 100.

If the guest memory address 150 for the guest physical function is stored in the guest page table 154, the host hypervisor 108 may create a shadow table 156 in the host page table 148 to mirror data in the guest page table 154. This enables the host hypervisor 108 to relatively efficiently determine a suitable mapping associated with a respective guest virtual function. When shadowing the guest page table 154 in the host page table 148 to create the shadow table 156, the host hypervisor 108 may translate the guest memory address 150 to the host memory address 152 such that the shadow table 156 includes the translated host memory address 152. Specifically, generating the translated host memory address 152 may involve mapping a virtual function number 144 for the guest memory address 150 to a different virtual function number for the host memory address 152. The host hypervisor 108 may similarly shadow a nested page table stored in the nested virtual machine 104 to create a different shadow table to store suitable mappings associated with at least one nested virtual function 146.

The host hypervisor 108 additionally can map device memory of the guest SR-IOV device 134 to each guest virtual function of the guest virtual functions 142*a-b* using another page table. A central processing unit (CPU) memory management unit (MMU) (not pictured) in the computing device 100 may manage the other page table. In some examples, the host hypervisor 108 can map a respective device memory for each guest virtual function at an offset 164, where the offset 164 is a multiple of the virtual function number 144 assigned to each guest virtual function. As an illustrative example, if each guest virtual function uses one megabyte of memory, a guest virtual function assigned to a virtual function number 144 of three can be mapped at an offset 164 of three megabytes.

The mappings may be used to fulfill requests. For example, the nested virtual machine 104 may transmit a request 102 to the nested virtual function 146. The request 102 can be a control request that involves privileges associated with the nested virtual machine 104. Examples of the request 102 can include allowing a data packet with a specific networking configuration or caching to enable pass-through of a device function. The request may need to be fulfilled by the physical function associated with the nested virtual function 146 (e.g., the first guest virtual function 142*a*). But, the nested virtual function 146 may not have the host memory address for the first guest virtual function 142*a*, and may therefore be unable to forward the request 102. Instead, the nested virtual function 146 can forward the request 102 to the physical function 138 for the SR-IOV device 106.

The host hypervisor 108 can attach to the physical function 138 to identify a translated memory address for the first guest virtual function 142*a*. The host hypervisor 108 can access the IOMMU 118 in the computing device 100 to perform translations using the mappings, since the IOMMU 118 manages the host page table 148. For example, the host hypervisor 108 can access the IOMMU 118 to translate the guest memory address 150 for the first guest virtual function 142*a* to its host memory address 152. Then, the host hypervisor 108 can forward the request 102 to the first guest virtual function 142*a* using the translated host memory address 152. The first guest virtual function 142*a* acting as a guest physical function can generate a response 158 based on the request 102. But, the first guest virtual function 142*a* may not have the host memory address for the nested virtual function 146, and may be therefore unable to forward the response 158. Instead, the guest physical function can forward the response 158 to the physical function 138 so another translation of memory addresses can be performed. Specifically, the host hypervisor 108, attaching to the physical function 138, may access the IOMMU 118 (e.g., using a driver) to translate a nested memory address 160 for the nested virtual function 146 to another host memory address 162 for the nested virtual function 146. The host hypervisor 108 then can use the translated other host memory address 162 for the nested virtual function 146 to forward the response 158 to the nested virtual function 146.

Although FIG. 1 shows a particular number and combination of components, this is intended to be illustrative and non-limiting. Other examples may include more components, fewer components, different components, or a different combination of components than is shown in FIG. 1. For example, although the computing device 100 of FIG. 1 includes one guest virtual machine 120 with two guest virtual functions 142*a-b* and one nested virtual machine 104 with one nested virtual function 146 for simplicity, the computing device 100 may include any number of virtual functions, virtual machines, or memory addresses in other examples.

Figure 2:
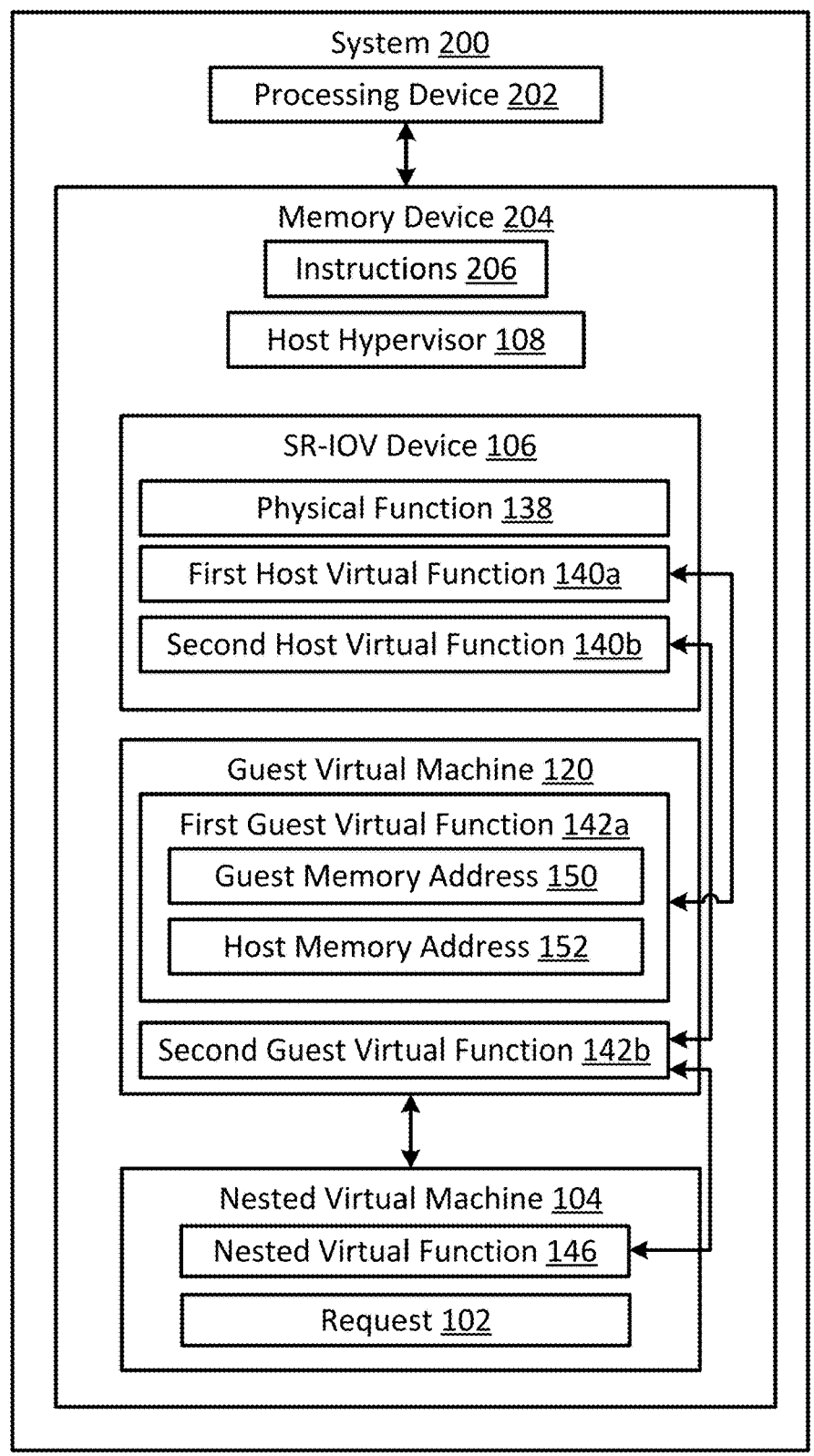
FIG. 2 is a block diagram of an example of a computing environment for passing single-root input-output virtualization functions to nested virtual machines according to one example of the present disclosure.

FIG. 2 is a block diagram of an example of another system 200 for passing single-root input-output virtualization (SR-IOV) functions to nested virtual machines according to one example of the present disclosure. As depicted, the system 200 can include a processing device 202 communicatively coupled to a memory device 204. In some examples, the processing device 202 and the memory device 204 can be the processing device 116 and the memory 112, respectively, of FIG. 1.

The processing device 202 can include one processing device or multiple processing devices. Non-limiting examples of the processing device 202 include a Field-Programmable Gate Array (FPGA), an application-specific integrated circuit (ASIC), and a microprocessor. The processing device 202 can execute instructions 206 stored in the memory device 204 to perform operations. In some examples, the instructions 206 can include processor-specific instructions generated by a compiler or an interpreter from code written in any suitable computer-programming language, such as C, C++, C #, Java, Python, or any combination of these.

The memory device 204 can include one memory device or multiple memory devices. The memory device 204 can be non-volatile and may include any type of memory device that retains stored information when powered off. Non-limiting examples of the memory device 204 include electrically erasable and programmable read-only memory (EEPROM), flash memory, or any other type of non-volatile memory. At least some of the memory device 204 includes a non-transitory computer-readable medium from which the processing device 202 can read instructions 206. A computer-readable medium can include electronic, optical, magnetic, or other storage devices capable of providing the processing device 202 with the instructions 206 or other program code. Non-limiting examples of a computer-readable medium include magnetic disk(s), memory chip(s), ROM, random-access memory (RAM), an ASIC, a configured processing device, and optical storage.

In some examples, the processing device 202 can execute the instructions 206 to perform operations. For example, the processing device 202 can facilitate a fulfillment of a request 102 from a nested virtual function 146 of a nested virtual machine 104 using mapping associated with SR-IOV device functions. The processing device 202 can execute a host hypervisor 108 in the system to assign at least two guest virtual functions 142a-b to a guest virtual machine 120. Each guest virtual function of the guest virtual functions 142a-b can be mapped to a respective host virtual function executed by the SR-IOV device 106. A first guest virtual function 142a of the guest virtual functions 142a-b can act as a guest physical function for the guest virtual machine 120.

The request 102 can be forwarded from the nested virtual function 146 to the processing device 202 by a physical function 138 executed by the SR-IOV device 106. Once the processing device 202 receives the request 102 generated by the nested virtual function 146, the processing device 202 may translate a guest memory address 150 for the guest physical function to a host memory address 152 for the guest physical function. The processing device 202 then can use the translated host memory address 152 to forward the request 102 to the guest physical function, enabling the guest physical function to fulfill the request 102 for the nested virtual function 146.

Figure 3:
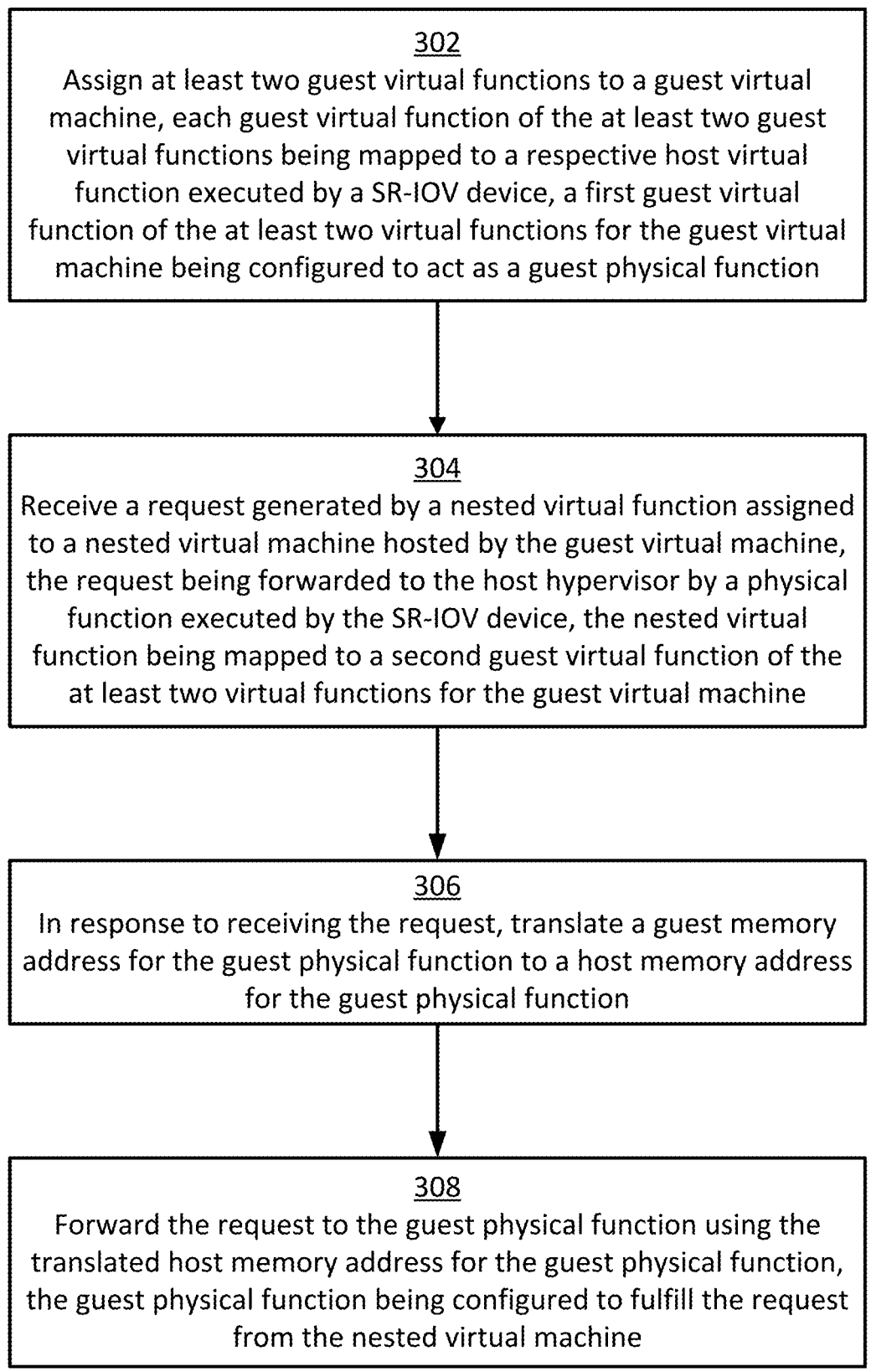
FIG. 3 is a flowchart of an example of a process for passing single-root input-output virtualization functions to nested virtual machines according to one example of the present disclosure.

FIG. 3 is a flowchart of an example of a process for passing single-root input-output virtualization (SR-IOV) functions to nested virtual machines according to one example of the present disclosure. In some examples, a processing device 202 can cause a host hypervisor 108 to perform one or more of the steps shown in FIG. 3. In other examples, the processing device 202 can implement more steps, fewer steps, different steps, or a different order of the steps depicted in FIG. 3. The steps of FIG. 3 are described below with reference to components discussed above in FIGS. 1 and 2.

At block 302, the processing device 202 assigns at least two guest virtual functions 142a-b to a guest virtual machine 120. Each guest virtual functions 142 can be mapped to a respective host virtual function executed by an SR-IOV device 106. For example, the processing device 202 can map a first guest virtual function 142a to a first host virtual function 140a. The first guest virtual function 142a for the guest virtual machine 120 can act as a guest physical function for the guest virtual machine 120. For example, the processing device 202 can use the first guest virtual function 142a to forward one or more response messages to a second guest virtual function 142b.

At block 304, the processing device 202 receives a request 102 generated by a nested virtual function 146 assigned to a nested virtual machine 104 hosted by the guest virtual machine 120. For example, the request 102 may involve unlinking a networking device associated with the nested virtual machine 104. The request 102 can be forwarded to the processing device 202 by a physical function 138 executed by the SR-IOV device 106. Additionally, the nested virtual function 146 can be mapped to the second guest virtual function 142b of the guest virtual functions 142a-b for the guest virtual machine 120.

At block 306, in response to receiving the request 102, the processing device 202 translates a guest memory address 150 for the guest physical function to a host memory address 152 for the guest physical function. To generate the translated host memory address 152, the processing device 202 can access an input-output memory management unit (IOMMU) 118 to determine a suitable mapping. A host page table 148 can be managed by the IOMMU 118, for example by remapping entries in the host page table 148 according to a translation table used to map guest memory addresses to host memory addresses. Determining the suitable mapping may involve querying the entries in the host page table 148 to determine the translated host memory address 152 such that the processing device 202 can forward the request to the guest physical function.

At block 308, the processing device 202 forwards the request 102 to the guest physical function using the translated host memory address 152 for the guest physical function. The guest physical function can be configured to fulfill the request 102 from the nested virtual machine 104. For example, the guest physical function can be configured to generate a response 158 to the request 102 using a physical function driver of the guest physical function. If the request 102 involves unlinking the networking device associated with the nested virtual machine 104, the response 158 may include a confirmation that the networking device has been unlinked, indicating that the request 102 is fulfilled.

The foregoing description of certain examples, including illustrated examples, has been presented only for the purpose of illustration and description and is not intended to be exhaustive or to limit the disclosure to the precise forms disclosed. Numerous modifications, adaptations, and uses thereof will be apparent to those skilled in the art without departing from the scope of the disclosure.

What is claimed is:

1. A system comprising:
a processing device; and
a memory device including instructions that are executable by the processing device for causing a host hypervisor to perform operations comprising:
assigning at least two guest virtual functions to a guest virtual machine, each guest virtual function of the at least two guest virtual functions being mapped to a respective host virtual function executed by a single-root input-output virtualization (SR-IOV) device, a first guest virtual function of the at least two guest virtual functions for the guest virtual machine being configured to act as a guest physical function;
receiving a request generated by a nested virtual function assigned to a nested virtual machine hosted by the guest virtual machine, the request being forwarded to the host hypervisor by a physical function executed by the SR-IOV device, the nested virtual function being mapped to a second guest virtual function of the at least two guest virtual functions for the guest virtual machine;
in response to receiving the request, translating a guest memory address for the guest physical function to a host memory address for the guest physical function; and
forwarding the request to the guest physical function using the translated host memory address for the guest physical function, the guest physical function being configured to fulfill the request from the nested virtual machine.

2. The system of claim 1, wherein the guest physical function is configured to, subsequent to receiving the request:
generate a response to the nested virtual function to fulfill the request; and
transmit the response to the physical function.

3. The system of claim 2, wherein the physical function is configured to, in response to receiving the response from the guest physical function:
   translate a nested memory address for the nested virtual function to another host memory address for the nested virtual function; and
   forwarding the response to the nested virtual function using the translated other host memory address for the nested virtual function.

4. The system of claim 1, wherein the operations further comprise:
   mapping the guest memory address for the guest physical function in a guest input-output memory management unit (IOMMU) for the guest virtual machine to the host memory address in an IOMMU; and
   accessing the IOMMU to translate the guest memory address to the host memory address in response to receiving the request.

5. The system of claim 4, wherein the operations further comprise:
   mapping a nested memory address for the nested virtual function to another host memory address in the IOMMU; and
   accessing the IOMMU to translate the nested memory address to the other host memory address prior to forwarding the response to the nested virtual function.

6. The system of claim 1, wherein the guest virtual machine comprises a guest SR-IOV device, and wherein the operations further comprise:
   mapping device memory of the guest SR-IOV device to each guest virtual function of the at least two guest virtual functions using a page table, wherein the device memory for each guest virtual function is mapped at an offset being a multiple of a virtual function number assigned to each guest virtual function.

7. The system of claim 6, wherein the operations further comprise, prior to mapping the device memory of the guest SR-IOV device:
   identifying each guest virtual function of the at least two guest virtual functions using a respective virtual function number.

8. A method comprising,
   assigning, by a processing device, at least two guest virtual functions to a guest virtual machine, each guest virtual function of the at least two guest virtual functions being mapped to a respective host virtual function executed by a single-root input-output virtualization (SR-IOV) device, a first guest virtual function of the at least two guest virtual functions for the guest virtual machine being configured to act as a guest physical function;
   receiving, by the processing device, a request generated by a nested virtual function assigned to a nested virtual machine hosted by the guest virtual machine, the request being forwarded to a host hypervisor by a physical function executed by the SR-IOV device, the nested virtual function being mapped to a second guest virtual function of the at least two guest virtual functions for the guest virtual machine;
   in response to receiving the request, translating, by the processing device, a guest memory address for the guest physical function to a host memory address for the guest physical function; and
   forwarding, by the processing device, the request to the guest physical function using the translated host memory address for the guest physical function, the guest physical function being configured to fulfill the request from the nested virtual machine.

9. The method of claim 8, further comprising, by the guest physical function subsequent to receiving the request:
   generating a response to the nested virtual function to fulfill the request; and
   transmitting the response to the physical function.

10. The method of claim 9, further comprising, by the physical function in response to receiving the response from the guest physical function:
    translating a nested memory address for the nested virtual function to another host memory address for the nested virtual function; and
    forwarding the response to the nested virtual function using the translated other host memory address for the nested virtual function.

11. The method of claim 8, further comprising:
    mapping the guest memory address for the guest physical function in a guest input-output memory management unit (IOMMU) for the guest virtual machine to the host memory address in an IOMMU; and
    accessing the IOMMU to translate the guest memory address to the host memory address in response to receiving the request.

12. The method of claim 11, further comprising:
    mapping a nested memory address for the nested virtual function to another host memory address in the IOMMU; and
    accessing the IOMMU to translate the nested memory address to the other host memory address prior to forwarding the response to the nested virtual function.

13. The method of claim 8, wherein the guest virtual machine includes a guest SR-IOV device, and wherein the method further comprises:
    mapping device memory of the guest SR-IOV device to each guest virtual function of the at least two guest virtual functions using a page table, wherein the device memory for each guest virtual function is mapped at an offset being a multiple of a virtual function number assigned to each guest virtual function.

14. The method of claim 13, further comprising, prior to mapping the device memory of the guest SR-IOV device:
    identifying each guest virtual function of the at least two guest virtual functions using a respective virtual function number.

15. A non-transitory computer-readable medium comprising instructions that are executable by a processing device for causing a host hypervisor to perform operations comprising:
    assigning at least two guest virtual functions to a guest virtual machine, each guest virtual function of the at least two guest virtual functions being mapped to a respective host virtual function executed by a single-root input-output virtualization (SR-IOV) device, a first guest virtual function of the at least two guest virtual functions for the guest virtual machine being configured to act as a guest physical function;
    receiving a request generated by a nested virtual function assigned to a nested virtual machine hosted by the guest virtual machine, the request being forwarded to the host hypervisor by a physical function executed by the SR-IOV device, the nested virtual function being mapped to a second guest virtual function of the at least two guest virtual functions for the guest virtual machine;

in response to receiving the request, translating a guest memory address for the guest physical function to a host memory address for the guest physical function; and forwarding the request to the guest physical function using the translated host memory address for the guest physical function, the guest physical function being configured to fulfill the request from the nested virtual machine.

16. The non-transitory computer-readable medium of claim 15, wherein the guest physical function is configured to, subsequent to receiving the request:

generate a response to the nested virtual function to fulfill the request; and transmit the response to the physical function.

17. The non-transitory computer-readable medium of claim 16, wherein the physical function is configured to, in response to receiving the response from the guest physical function:

translate a nested memory address for the nested virtual function to another host memory address for the nested virtual function; and forwarding the response to the nested virtual function using the translated other host memory address for the nested virtual function.

18. The non-transitory computer-readable medium of claim 15, wherein the operations further comprise:

mapping the guest memory address for the guest physical function in a guest input-output memory management unit (IOMMU) for the guest virtual machine to the host memory address in an IOMMU; and accessing the IOMMU to translate the guest memory address to the host memory address in response to receiving the request.

19. The non-transitory computer-readable medium of claim 18, wherein the operations further comprise:

mapping a nested memory address for the nested virtual function to another host memory address in the IOMMU; and accessing the IOMMU to translate the nested memory address to the other host memory address prior to forwarding the response to the nested virtual function.

20. The non-transitory computer-readable medium of claim 15, wherein the guest virtual machine comprises a guest SR-IOV device, and wherein the operations further comprise:

mapping device memory of the guest SR-IOV device to each guest virtual function of the at least two guest virtual functions using a page table, wherein the device memory for each guest virtual function is mapped at an offset being a multiple of a virtual function number assigned to each guest virtual function.

* * * * *